United States Patent [19]

Hayden, Jr.

[11] 4,129,040

[45] Dec. 12, 1978

[54] ENGINE OVERSPEED CONTROL SYSTEM

[76] Inventor: Joseph C. Hayden, Jr., 7902 Captain Dr., Houston, Tex. 77036

[21] Appl. No.: 837,906

[22] Filed: Sep. 29, 1977

[51] Int. Cl.[2] .......... G01M 15/00

[52] U.S. Cl. .......... 73/507; 123/198 D; 340/53

[58] Field of Search .......... 73/507, 1 R, 2; 123/198 D, 110, 198 DB; 340/53; 307/9; 116/114 AE

[56] References Cited

U.S. PATENT DOCUMENTS 3,319,733 5/1967 Rath et al. .......... 340/53 X

FOREIGN PATENT DOCUMENTS 1374187 11/1974 United Kingdom .......... 123/198 D

*Primary Examiner*—Jerry W. Myracle

*Attorney, Agent, or Firm*—Browning, Bushman & Zamecki

[57] ABSTRACT

An overspeed control system which is electropneumatic and automatic in its operation is supplied. An engine speed sensing transducer supplies input signals to an electronic monitor which determines if an overspeed condition is about to occur and turns on a warning indicator. If further overspeed condition occurs the monitor supplies an output signal to a solenoid operated air supply control valve which vents high pressure air to a pneumatically operated valve which shuts off the engine air intake. Means are provided for testing the operation of the electronic and pneumatic components of the system independent of the operation of the engine to ensure reliability of the system.

13 Claims, 2 Drawing Figures

ENGINE OVERSPEED CONTROL SYSTEM

FIELD OF THE INVENTION

This invention relates to speed control systems for internal combustion engines. More particularly, the invention relates to systems for controlling overspeed of diesel engines or other fuel injected engines when operated in a combustible atmosphere.

BACKGROUND OF THE INVENTION

When operating internal combustion engines, particularly fuel injected internal combustion engines such as those of the diesel type, in certain mining and fuel loading and unloading operations, the possibility of a combustible air/fuel mixture surrounding the engine. In this situation, the air intake to the internal combustion engine may contain enough fuel vapors to provide an uncontrollable air/fuel mixture being fed into the engine solely through the air intake. In such a case, the engine can be caused to overspeed or run away since it is no longer under the control of the fuel input throttle mechanism.

In the prior art, this type of dangerous situation has been guarded against by the provision on the vehicle containing the fuel injected internal combustion engine, of manual shut off controls to shut off either the air or fuel supply or both to the internal combustion engine. Representative examples of such manual control systems are illustrated in U.S. Pat. No. 2,714,290 to Rachuig.

Somewhat more elaborate semi-automatic control systems for controlling an overspeed or engine runaway in a combustible atmosphere are provided in U.S. Pat. No. 2,783,753 to Hofer. In this latter more nearly automatic system, engine manifold pressure sensing devices are used to control air cutoff valves in the air intake system of the engine.

To provide the desired safeguard, an engine overspeed control system should exhibit rapid response time. Furthermore, the overspeed control system should include the capability for testing the operability of the system without actually running the engine in overspeed condition, and of resetting the control system once the engine overspeed condition has ceased.

BRIEF DESCRIPTION OF THE INVENTION

The engine overspeed control system of the present invention is provided with a fully electronic, fully automatic detecting means for sensing the speed of the engine during its operation. Moreover, the system of the present invention is provided with an early overspeed warning indicator in the form of an alarm bell which indicates a forewarning signal to the operator when a threshold speed approaching engine overspeed has been reached. The system further automatically senses the engine overspeed condition upon occurance and causes a solenoid operated air control valve to come into operation thereby triggering an air pressure operated air intake control valve to entirely shut off the air supply to the runaway engine. The loss of air intake shuts down the operation of the engine should an overspeed condition occur. Moreover, the system of the present invention is also provided with a testing capability which allows both the electronic and pneumatically operated portions of the systems to be independently tested without placing the engine on which the system is mounted in an actual overspeed condition. Additionally, the system of the present invention is provided with the further capability of monitoring an overspeed condition occuring when the internal combustion engine is operated in a power take off mode such as is used for driving a hydraulic pump in a fuel loading or unloading situation as on a fuel carrying truck. In this mode of operation, the system of the present invention may be utilized to control an overspeed power take off from the engine which occurs at a lower rpm than that which would normally comprise an engine overspeed condition under normal operating conditions. The system of the present invention is further provided with an ease of resetability after the cessation of an engine overspeed for resetting the control valves in the system which is heretofore unknown in the prior art.

The above and other objects, features and advantages of the present invention are best understood by reference to the following detailed description of the invention taken together in conjunction with the appended drawings in which:

DESCRIPTION OF THE PREFERRED EMBODIMENTS

Figure 1:
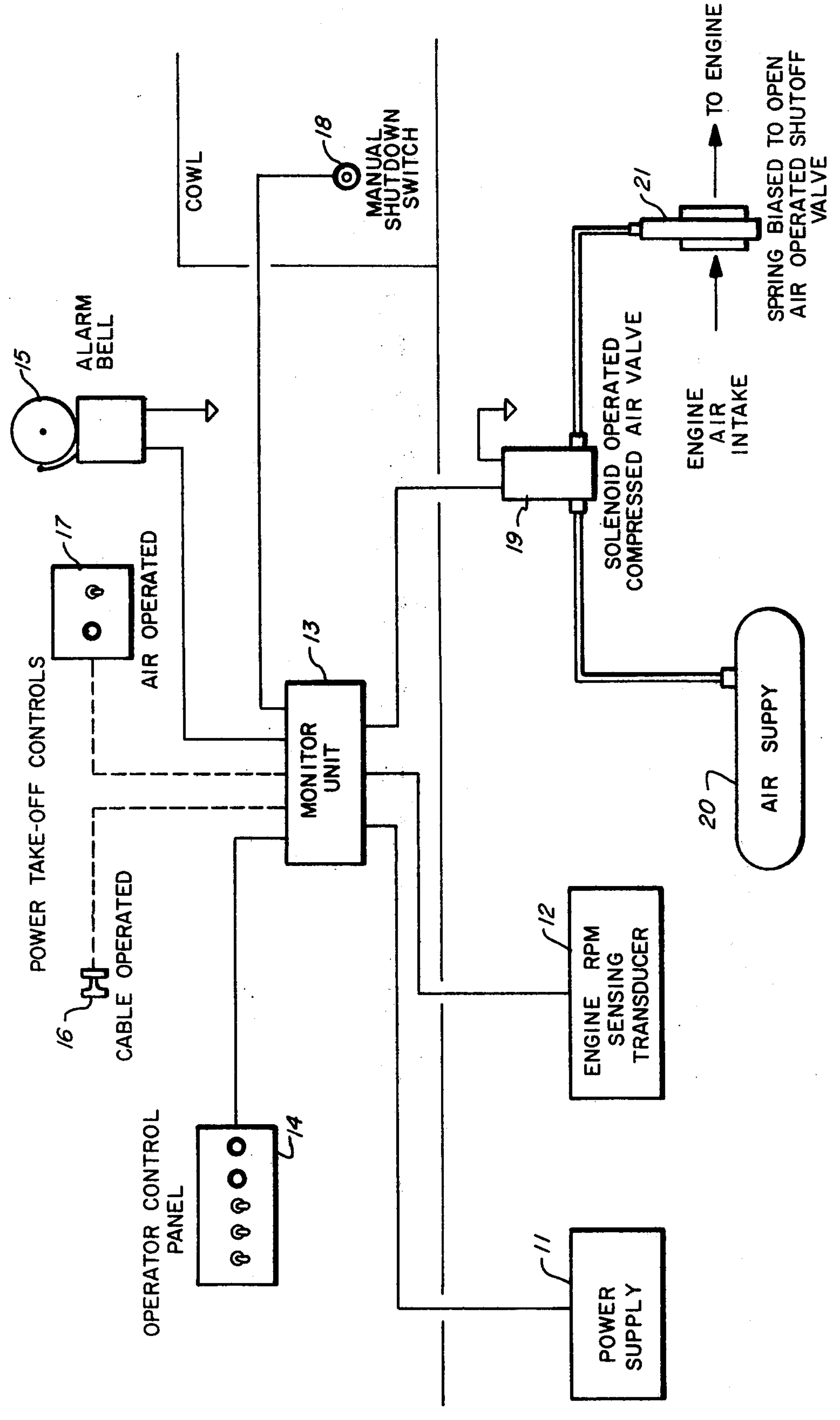
FIG. 1 is a block diagram illustrating an engine overspeed control system in accordance with the concepts of the present invention.

Referring initially to FIG. 1, a engine overspeed control system in accordance with the concepts of the present invention is illustrated in schematic block diagram form. The heart of the control system is an electronic monitor unit 13 which is interfaced with various operator controls and with a transducer system for sensing the engine rpm and a shut off system for effectively shutting off the air intake to the internal combustion engine should a runaway or overspeed condition occur. The monitor unit 13 will be described in more detail subsequently.

One example of a situation involving the dangers of operating an internal combustion engine of the fuel injection type in a combustible atmosphere occurs in the situation where a fuel tank truck is loading or unloading and leakage occurs causing an accummulation or body of fuel vapor around the truck. If the truck engine is running at this time, it could begin to draw in through the air intake a concentrated charge of the combustible air/fuel mixture vapor. As this combustible vapor is being drawn in through the air intake it does not have to pass through the throttle. Thus, the sudden infusion of additional fuel into the engine can cause it to speed up and run away. The engine can actually obtain such a high speed in such an instance that it can burn itself up and explode, throwing bits of white hot metal in all directions. This in turn could ignite the remainder of the scavenged body of combustible vapor and cause a tremendous explosion and ensuing fire. If the fuel tank truck engine is not running at this time, and an attempt is made to start the engine then such a runaway could also occur together with the ensuing threat of fire and explosion. Thus, it is clear that in such a situation, an engine overspeed control system such as that of the present invention would have great utility as a safety factor as well as for the purpose of protecting the truck, pump and other hardware equipment from mechanical damage.

Referring again to FIG. 1, the electronic monitor unit 13 is powered by a conventional power supply unit 11. A magnetic engine rpm sensing transducer of conventional type 12 which is mounted on the fly wheel housing of the engine is used to supply AC input signals to the monitor unit 13. The frequency of these AC input signals is proportional to the speed of the engine. The operator control panel 14 together with a power take off control panel 16 or 17 (in the case of cable operated power take offs or air operated power take offs, respectively) also supplies control input signals to the monitor unit 13. Moreover, a manual override shutdown switch 18 may be used to supply an input signal to the monitor unit 13 which causes the manual override of the control of the system by the monitor unit 13 and directly causes the engine to shutdown.

In operation, the monitor unit 13 receives the engine speed signals from the transducer 12 and if the engine reaches a specific rpm point which has been determined to be initially indicative of a possible overspeed condition the monitor unit 13 activates an alarm bell 15 which may be mounted, for example, under the dash of the motor vehicle containing the system in order to alert the operator. If an actual overspeed condition occurs, the occurance of a still higher engine rpm causes an output signal from the monitor unit 13 to be supplied to a solenoid operated compressed air control valve 19 which vents an air supply 20 into a spring biased air operated shut off valve 21. The triggering of air operated valve 21 shuts off the flow of engine air intake to the engine thus causing the engine to immediately stop. On the other hand, if the potential engine overspeed condition is corrected by the operator upon the operation of the alarm bell 15 and the engine speed is thereby reduced, the monitor unit 13 automatically shuts off the alarm bell 15 and resets its monitoring condition. Typically, a complete cycling time for the monitor system of the present invention from the initial overspeed impulse to the engine shut down in the occurance of an overspeed condition is of the order of one second or less. Thus, significant damage to the engine and/or contingent catastrophic explosion may readily be prevented by the system of the present invention.

Because the present engine overspeed control system is largely electronic and air operated, the possibility of mechanical failure is minimized. The system has a minimum of moving mechanical parts and wear points. Therefore the present system provides a rugged and reliable control means for preventing the occurance of a catastrophic engine overspeed. Additionally, the system of the present invention is provided with a nondestructive testing feature. By using appropriate control switches on the operator control panel 14 of FIG. 1 and the power take off control panels 16 or 17 of FIG. 1, the operation of the monitoring unit 13 may be tested. The system is provided with a shut down override switch to prevent the actual triggering of the solenoid operated compressed air control valve 19. Operation of this switch can be used to trigger a test signal indicative of an engine overspeed condition as input to the monitor unit 13. This may be done in either the direct engine operating mode or the power take off mode of operation. This overspeed test signal supplied as input to the monitor unit 13 may then be utilized to test the electronic circuitry of the monitor unit 13 and to provide a test light indicator indicating that the solenoid operated compressed air valve 19 would have been triggered upon the actual occurance of an overspeed condition.

Figure 2:
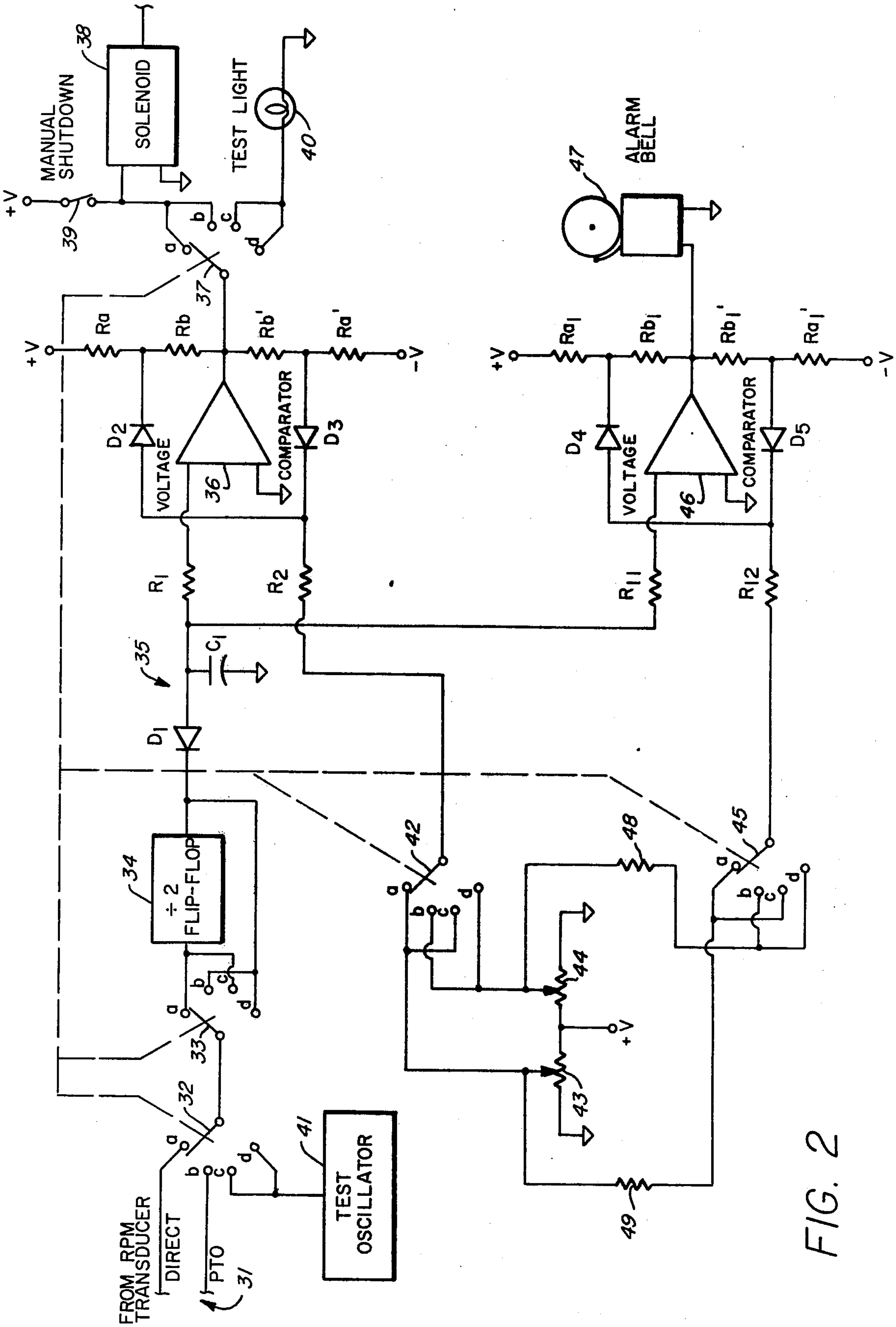
FIG. 2 is a circuit diagram illustrating in further detail the electronic component portion of the engine overspeed control system of the present invention.

Turning now to FIG. 2, a circuit diagram of the monitor unit 13 of FIG. 1 is illustrated. Input signals from the engine rpm sensing transducer 12 of FIG. 1 or a power take off rpm sensing transducer (not shown) are supplied at terminals 31 as inputs to the monitor unit 13. A multiple switch 32 located on the operator control panel 14 of FIG. 1 and which is ganged to other multiple pole switches 33, 37, 45 and 42 is used to control the mode of operation of the monitor unit 13. With the switch 32 placed in operative position a the normal mode of operation of the engine overspeed monitor unit 13 of FIG. 1 will be chosen. An input signal from the engine rpm sensing transducer 12 of FIG. 1 is thus supplied as input to a divide by 2 flip-flop 34 via switch 33. The divide by 2 flip-flop 34 causes a division by 2 of the input frequency of the engine rpm signal in this normal mode of operation. The output signal from the divide by 2 flip-flop 34 is supplied to an integrator circuit 35 comprising diode $D_1$ and capacitor $C_1$. The integrator circuit 35 thus provides an output voltage whose level is proportional to the engine rpm.

The output signal from the integrator circuit 35 is supplied as input to two operational amplifier voltage comparators 36 and 46. Operational amplifier 36 operates with its associated circuit components such as diodes $D_2$, $D_3$ and resistor network $R_a$, $R_b$, $R_{b'}$, and $R_{a'}$. Similarly, the operational amplifier 46 operates together with its associated circuit components diodes $D_4$, $D_5$, resistor network $R_{a1}$, $R_{b1}$, $R_{b1'}$, and $R_{a1'}$. The operational amplifier circuits 36 and 46 thus comprise fully clamped voltage comparator circuits. The characteristics of operation of such a fully clamped comparator circuit are that if the input signal applied to the circuit does not exceed a specified level determined by the bias condition supplied to the circuit, a zero or effectively zero voltage level output is supplied from the comparator. If the input voltage exceeds a specified level which is determined by the bias voltage supplied to the comparator circuit then an output voltage of $+V$ or $-V$ volts is supplied as output from the voltage comparator network.

The comparison bias voltages to the voltage comparators 36 and 46 are supplied from a bias power supply comprising potentiometers 43, 44 and dropping resistors 48 and 49 which are selected via ganged switches 42 and 45. The potentiometers 43 and 44 may thus be used to vary the set points of operation of the voltage comparator circuits 36 and 46. If an initial engine overspeed condition occurs at set points as determined by the setting of potentiometer 43 and dropping resistor 49 as determined by the voltage comparator circuit 46 for example, an alarm bell 47 is triggered by the voltage output of the voltage comparator 46 when an initial engine overspeed condition is sensed. The alarm bell 47 will continue to ring until the output voltage from the voltage comparator 46 returns to its zero volt condition. This, in turn, occurs only when the engine overspeed input signal supplied to comparator 46 from the integrator circuit 35 has returned to a level below that which triggers the voltage comparator 46 to provide an output voltage level. Similarly, the threshold voltage of voltage comparator 36 may be set slightly higher than that of voltage comparator 46 so that if the engine overspeed condition continues and the output of integrator 35 increases (at an rpm higher than that causing the triggering of voltage comparator 46) an output level voltage would be provided from the voltage comparator 36. This output is supplied via ganged switch 37 to the solenoid 38 of the solenoid operated compressed air valve 19 of FIG. 1. When this condition occurs the solenoid operated valve is triggered, causing the air supply 20 to be vented through the valve 19 into the spring-biased-to-open-position, air-operated shut off valve 21 of FIG. 1. Operation of the valve 21 shuts off the air supply to the engine as long as the air pressure is maintained by valve 19 being open. When valve 19 is closed the air pressure to valve 21 is removed and the spring biasing means resets the valve open, allowing the engine to run.

When the ganged switches 32, 33, 37, 42 and 45 are placed in position b the monitor unit 13 is conditioned for operation in the power take off mode. In this condition, the input signal from the engine rpm sensing transducer 12 is supplied directly as input to the integrator circuit 35 rather than through the divide by 2 flip-flop circuit 34. Similarly, a different comparator bias level (i.e. that determined by potentiometer 44 and dropping resistor 48) is supplied to the set points of voltage comparators 36 and 46. Thus the set points for operation in power take off mode may be independently set from those when operating in the engine monitoring direct mode. Otherwise, the remainder of the system with the switch in position b operates as described previously, first triggering the alarm bell 47 should a power take off overspeed initial condition occur and subsequently triggering the solenoid 38 should an actual overspeed condition occur in the power take off mode, thereby shutting down the engine.

In order to test the operation of the unit in either the engine or power take off monitoring mode the ganged switches are placed in positions c and d, respectively. In either of these positions, the output of a test oscillator 41 which comprises a swept frequency variable frequency oscillator is supplied as inputs to the monitor unit 13. The test oscillator 41 comprises an AC output oscillator of swept or varying frequency corresponding to a typical range of engine operation and including an upper range which comprises an engine overspeed condition. The circuits function exactly as described previously with the exception that in the test condition, the output of the voltage comparator 36 is not supplied to the solenoid 38 when an overspeed condition is sensed, but rather is supplied via ganged switch 37 to a test light indicator 40 which merely indicates that the circuit is functioning properly. Thus, actual shut down of the engine does not occur under this condition.

Finally, in addition, a manual shut down switch 39 (which corresponds to the manual shut down switch 18 of FIG. 1) is provided to test manually the operation of the solenoid operated compressed air control valve of FIG. 1 and the air supply 20. By closing the switch 39 the solenoid is directly activated by application of voltage from the power supply unit 11 to test the operation of the valves 19 and 21 of FIG. 1.

Thus, it is seen that the operating system of the present invention provides a completely electronic and pneumatically operated engine shut down control system for preventing the occurance of catastrophic engine overspeed conditions in a fuel injected internal combustion engine. The system is provided with various flexible testing means in order to determine operability of the system and is provided with a minimum of mechanical moving parts so that wear points are minimized. Thus a relatively economical and versatile system is provided whose reliability may be maintained via the testing procedures outlined.

The foregoing descriptions may make other alternative arrangements apparent to those skilled in the art. It is accordingly the aim of the appended claims to cover all such changes and modifications as fall within the true spirit and scope of the invention.

I claim:

1. A system for monitoring and controlling the speed of an internal combustion engine, comprising:

means for sensing the speed of rotation of the crankshaft of an internal combustion engine and for providing an electrical signal representative thereof;

pneumatically operable valve means spring biased to a normally open condition for controlling the air intake of an internal combustion engine;

means for supplying air under pressure to said pneumatically operable valve means;

means for comparing said representative speed of rotation signal with a predetermined engine overspeed setpoint signal and for providing an output signal only when said representative signal exceeds said predetermined signal; and means responsive to said output signal for controlling a supply of air under pressure from said means for supplying air to said pneumatically operable valve means, whereby when said output signal is present said pneumatically operable valve means is allowed to receive air under pressure thereby closing off the air intake of an internal combustion engine.

2. The system of claim 1 and further including:

second means for comparing said representative speed of rotation signal with a second different engine initial overspeed setpoint signal and for providing a second output signal only when said representative signal exceeds said second initial overspeed setpoint signal; and alarm means, responsive to said second output signal, for providing an alarm signal to an engine operator upon the occurance of an initial engine overspeed condition in an internal combustion engine.

3. The system of claim 2 wherein said alarm means comprises an audible alarm generation means.

4. The system of claim 1 and further including:

test signal generation means for generating an electrical test signal representative of said engine speed representative signal;

switching means for switching the input signal to said system from said engine speed representative signal to said test signal and for switching said output signal from said means for controlling a supply of air to an output test indicator, thereby providing a testing facility for said system independent of engine running conditions.

5. The system of claim 4 and further including:

manually operable switching means for directly operating said means for controlling a supply of air to said pneumatically operable valve means, thereby providing a testing mode for said pneumatically operable valve means and said controlling means which is independent of engine running conditions.

6. The system of claim 1 and further including:

means for varying the frequency response of the system from a first preselected frequency response range to a second preselected frequency response range different from said first frequency response range to thereby provide an engine overspeed monitoring and controlling system for use with an external power take off system from the internal combustion engine.

7. The system of claim 6 wherein said means for varying the frequency response of said system includes switching means and AC signal frequency divider means.

8. The system of claim 1 and further including:

means for manually varying said predetermined engine overspeed setpoint over a preselected range of valves.

9. The system of claim 1 wherein said comparing means comprises means for comparing a first voltage level representative of said rotation speed representative signal and a second voltage level representative of said setpoint signal as a function of the frequency of said rotation speed representative signal and including intergrator means for providing said first voltage level.

10. The system of claim 1 wherein said means for sensing the speed of rotation of the crankshaft of an internal combustion engine comprises a magnetic sensing transducer means supplying an AC output signal whose frequency is proportional to the speed of rotation of the crankshaft of an internal combustion engine.

11. A system for monitoring and controlling the speed of an internal combustion engine comprising:

means for sensing the speed of rotation of the crankshaft of an internal combustion engine and for providing an electrical signal representative thereof;

pneumatically operable valve means spring biased to a normally open condition for controlling the air intake of an internal combustion engine;

means for supplying air under pressure to said pneumatically operable valve means;

means for comparing said representative speed of rotation signal with a predetermined setpoint signal indicative of an overspeed condition of a power take off system from an internal combustion engine, and for providing an output signal only when said representative signal exceeds said predetermined setpoint signal; and means responsive to said output signal for controlling a supply of air under pressure from said means for supplying air to said pneumatically operable valve means, whereby when said output signal is present said pneumatically operable valve means is allowed to receive air under pressure thereby closing off the air intake of an internal combustion engine.

12. The system of claim 11 and further comprising:

second means for comparing said representative speed of rotation signal with a second different power take off system initial overspeed setpoint signal and for providing a second output signal only when said representative signal exceeds said second initial overspeed setpoint signal; and alarm means, responsive to said second output signal, for providing an alarm signal to an engine operator upon the occurance of an initial power take off system overspeed condition.

13. The system of claim 12 wherein said alarm means comprises an audible alarm generation means.

* * * * *